(12) United States Patent
Johnson et al.

(10) Patent No.: US 7,694,695 B2
(45) Date of Patent: Apr. 13, 2010

(54) CONTROLLED EXPANSION HOSE

(75) Inventors: Alan C. Johnson, Iola, KS (US);
Alexandra Mei Ng, Aurora, CO (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 12/037,626

(22) Filed: Feb. 26, 2008

(65) Prior Publication Data

US 2009/0211660 A1    Aug. 27, 2009

(51) Int. Cl.
*F16L 11/00* (2006.01)

(52) U.S. Cl. ............... 138/123; 138/124; 138/137; 138/140; 138/126

(58) Field of Classification Search ......... 138/123–126, 138/137, 141, 140; 428/36.1
See application file for complete search history.

(56) References Cited

U.S. PATENT DOCUMENTS

| 3,383,258 | A |   | 5/1968  | Houlston         |         |
|-----------|---|---|---------|------------------|---------|
| 3,599,677 | A |   | 8/1971  | O'Brien          |         |
| 3,605,818 | A |   | 9/1971  | Balchan          |         |
| 4,273,160 | A | * | 6/1981  | Lowles           | 138/124 |
| 4,343,333 | A |   | 8/1982  | Keister          |         |
| 4,604,155 | A | * | 8/1986  | McKiernan        | 156/287 |
| 4,633,912 | A |   | 1/1987  | Pilkington et al.|         |
| 4,688,605 | A |   | 8/1987  | Eisenzimmer et al.|        |
| 4,870,995 | A | * | 10/1989 | Igarashi et al.  | 138/126 |
| 4,898,212 | A |   | 2/1990  | Searfoss et al.  |         |
| 4,952,626 | A | * | 8/1990  | Kordomenos et al.| 525/28  |
| 5,077,108 | A |   | 12/1991 | Ozawa et al.     |         |
| 5,172,729 | A |   | 12/1992 | Vantellini       |         |
| 5,316,046 | A |   | 5/1994  | Igarashi et al.  |         |
| 5,526,848 | A | * | 6/1996  | Terashima et al. | 138/125 |
| 5,660,210 | A |   | 8/1997  | Ikeda et al.     |         |
| 5,826,623 | A |   | 10/1998 | Akiyoshi et al.  |         |
| 6,155,378 | A |   | 12/2000 | Qatu et al.      |         |
| 6,220,304 | B1| * | 4/2001  | Horiba et al.    | 138/126 |
| 6,626,211 | B2| * | 9/2003  | Mizutani et al.  | 138/126 |

(Continued)

FOREIGN PATENT DOCUMENTS

JP    02-147328   A2   6/1990

(Continued)

OTHER PUBLICATIONS

Ernest R. Caswell, "Wellington Sears Handbook of Industrial Textiles", Section 292; 1963.

(Continued)

*Primary Examiner*—Patrick F Brinson
(74) *Attorney, Agent, or Firm*—P. N. Dunlap, Esq.; J. A. Thurnau, Esq.; J. L. Mahurin, Esq.

(57) ABSTRACT

An expansion hose adapted for smoothing pressure fluctuations in a hydraulic system having an inner tube, a textile reinforcement, and an outer cover. The reinforcement includes a plurality of yarns, which in turn have a plurality of filaments of first fiber material type and a plurality of filaments of second fiber material type, with first fiber type having elongation at break higher than the second fiber type by at least about 4% elongation. The expansion hose may be part of an assembly including at least one fitting, coupling, bracket, hose clamp, or other hose.

21 Claims, 2 Drawing Sheets

U.S. PATENT DOCUMENTS

| | | |
|---|---|---|
| 6,677,018 B1 | 1/2004 | Satoh |
| 6,742,545 B2 | 6/2004 | Fisher et al. |
| 6,807,988 B2 | 10/2004 | Powell et al. |
| 6,854,485 B2 * | 2/2005 | Daikai et al. ............... 138/30 |
| 7,021,339 B2 * | 4/2006 | Hagiwara et al. ........... 138/123 |
| 7,063,181 B1 | 6/2006 | Cunningham |
| 7,143,789 B2 | 12/2006 | Nagy et al. |
| 2001/0045237 A1 * | 11/2001 | Monobe et al. ............ 138/126 |
| 2002/0144743 A1 * | 10/2002 | Daikai et al. .............. 138/126 |
| 2006/0076070 A1 * | 4/2006 | Yanadori .................. 138/126 |

FOREIGN PATENT DOCUMENTS

| | | |
|---|---|---|
| JP | 02-283992 A | 11/1990 |
| JP | 2000-46255 A | 2/2000 |
| JP | 2006-226339 A | 8/2006 |
| KR | 10-2005-0112955 A | 12/2005 |

OTHER PUBLICATIONS

International Search Report; PCT/US2009/001115.

* cited by examiner

CONTROLLED EXPANSION HOSE

BACKGROUND OF THE INVENTION

1. Field of the Invention

This invention relates generally to a high-pressure, controlled-expansion hose suitable for power steering applications, more particularly to an expansion hose with a textile reinforcement layer comprising both nylon and polyester filaments, and specifically to an expansion hose with a first braided reinforcement layer of nylon and a second braided reinforcement layer of polyester.

2. Description of the Prior Art

Expansion hoses are used in high pressure fluid transfer systems or fluid power systems, such as hydraulic systems, power steering systems, or the like. In such dynamic applications, where a hose is subject to pressure pulsation, an expansion hose with a controlled or predetermined amount of volumetric expansion may be useful for smoothing pressure fluctuations, damping vibrations, reducing noise, or otherwise improving the response of the system to pressure pulses. Volume expansion refers to the variation of inner volume of hose when supplied with a high pressure fluid. Controlled expansion refers to a hose designed to exhibit a predetermined amount of volumetric expansion at a given internal pressure. Such a hose is commonly referred to as "expansion hose." One classification scheme which may be used for expansion hose is based on the volumetric expansion per unit length of hose, specified in cc/m. For example, a standard issued by SAE International, SAE J2050, describes expansion hose for power steering pressure hose applications as having volumetric expansion in the range from 10 to 46 cc/m at 9.0 MPa internal pressure for a hose having an internal diameter ("ID") of 9.85 mm. Another specification, issued by a vehicle manufacturer calls for high expansion power steering hose to exhibit from 27 to 40 cc/m volumetric expansion at 9.0 MPa for an ID of about 10 mm. Thus, expansion hose may somewhat arbitrarily be further classified as low expansion hose or high expansion hose. Low expansion hose may have a relative volumetric expansion of about 13% to about 35% at a predetermined maximum working pressure. High expansion hose may have a volumetric expansion of more than about 35% at a predetermined maximum working pressure.

The expansion hose is generally designed to have a burst pressure of about four times the maximum working pressure. High burst pressure may generally be obtained by using reinforcing layers of high strength wires, fibers, or yarns. But high burst pressure and high volumetric expansion may be opposing goals.

Fatigue resistance is also required when expansion hoses are subjected to dynamic conditions, such as repeated high pressure pulses. For example, SAE J2050 calls for minimum performance of 200,000 pressure cycles that peak at 100% of the design working pressure of 10.5 MPa. Unfortunately, as demands on expansion hose move generally toward higher pressures, temperatures and fatigue resistance, the three goals of having a certain minimum burst pressure, a predetermined volumetric expansion at a certain working pressure, and a high impulse fatigue resistance are found to be in opposition. Simply increasing the working pressure will increase the volumetric expansion and decrease the fatigue life. Increasing the amount of reinforcement can increase the burst pressure, but at the same time will decrease the volumetric expansion. Reinforcement parameters, such as braid angle or spiral angle, can be used to control volumetric expansion somewhat, but deviations from the usual optimum settings also cause negative effects on other aspects of hose performance such as length stability.

U.S. Pat. No. 5,172,729 discloses an example of an expansion hose having an inner flexible hollow body which extends coaxially to an outer pressure hose. Such dual hose designs are complex.

U.S. Pat. No. 7,063,181 discloses a power steering hose having a multi-layer inner core, covered with two tubular reinforcement layers in the form of a braid or spiral or woven material such as nylon. The expansion of the hose is reported to be controlled through the elongation of the yarn and the angle at which it is applied, but no examples thereof are offered.

U.S. Pat. No. 5,660,210 discloses a reinforced hose having at least two reinforcing thread layers, including a lower layer of a polyester thread having 10% elongation at break, and an upper layer of polyester or polyvinyl alcohol thread. The resulting hose is reported to have excellent fatigue resistance but very small volume expansion. U.S. Pat. No. 5,660,210 teaches that there has been no reinforcing thread which satisfies both characteristics, i.e. fatigue resistance and volume expansion, simultaneously. Even when the materials of the two layers are varied, no construction has yet satisfactorily reconciled these two contradictory characteristics.

U.S. Pat. No. 6,807,988 discloses a thermoplastic reinforced hose construction having at least a first and a second reinforcing layer of a first and a second fiber, with the two layers bonded together by a bonding agent that is controlled to wet only a portion of the filaments. Radial expansion and axial elongation are said to be affected by the pitch angle of spiraled layers, which are oppositely wound in pairs to counterbalance torsional twisting effects.

U.S. Pat. No. 5,316,046 discloses a power steering hose having one or more reinforcement layers of organic fibers. The hose exhibits a volumetric expansion of 20 to 26 cc/m at 9 MPa (6-8 cc/ft at 91 kgf/cm$^2$), which corresponds to about 35% volumetric expansion.

U.S. Pat. No. 5,077,108 discloses composite laminates for hose including fibrous reinforcements in the form of braids of a material selected from nylons, polyesters, rayons, cottons, vinylons, aramids, and the like.

U.S. Pat. No. 6,677,018 discloses a high pressure hose having a plurality of reinforced layers including a steel wire reinforced layer and an organic fiber reinforced layer based on aromatic polyamide.

U.S. Pat. No. 7,143,789 discloses a high pressure hose having an odd number of layers of reinforcing plies which are preferably identical or at least their moduli of elasticity are similar.

U.S. Pat. No. 3,383,258 discloses a high pressure hose having at least one layer of braided yarn comprising polyester filaments.

U.S. Pat. No. 3,605,818 discloses a high pressure hose having at least one braided layer of a binder-impregnated ribbon of untwisted multi-filament yarns comprising synthetic or natural filaments. A preferred material is a biconstituent filament of melt-blended nylon and polyester.

Japanese Unexamined Patent Publication JP 02-147328 discloses a cord for reinforcing resin hose comprising a core-sheath composite fiber of polyester core and nylon sheath. However, it is known in the art that blends of two fibers of different properties generally do not follow a linear relationship with blend proportion, and the resultant property is generally less than proportional. (See e.g. Wellington Sears Handbook of Industrial Textiles, §292 (1963).)

U.S. Pat. No. 4,898,212 discloses a flexible reinforced hose having a pair of oppositely helically wound layers of reinforcement comprising a first fiber (aromatic polyamide) having a tenacity of about 12 to about 25 grams for denier and an elongation at break of about 2% to about 8% that are disposed in alternating contiguous relationship to a second fiber (preferably polyester) having a tenacity of from about 7 to 11 grams per denier and an elongation at break of about 9% to about 17%. An example hose having a first braided layer of Kevlar and a second braided layer of polyester exhibited inferior flex fatigue resistance. The volumetric expansion of the disclosed hoses was too low to be considered expansion hose.

SUMMARY

The present invention is directed to an expansion hose that provides a predetermined volumetric expansion and excellent impulse pressure fatigue resistance for high-pressure applications such as power steering hose. In particular, the present invention is related to an expansion hose having improved impulse fatigue resistance and burst pressure at a higher volumetric expansion and/or working pressure than prior art hose. In other words, the present invention optimizes simultaneously two contradictory characteristics, i.e. impulse fatigue resistance and controlled volume expansion.

The present invention is directed to an expansion hose having an inner tube, a textile reinforcement, and an outer cover. The textile reinforcement includes a plurality of yarns, which in turn include filaments of a first fiber material type and a second fiber material type. In one embodiment, the first fiber type has elongation at break higher than the second fiber type by at least about 4% elongation. In another embodiment, the first fiber type is nylon and the second fiber type is polyester.

The textile reinforcement may be present as two separate textile layers, one of each fiber type. The layers may be balanced reinforcing layers, and the layer of yarns of the first fiber type may be inward of the layer of yarns of the second fiber type. The textile layers may be braided or wrapped or spiraled pairs of opposite wrap direction.

The expansion hose may further include a friction layer between two reinforcing layers. The textile reinforcement may be substantially penetrated with an adhesive treatment.

In another embodiment, the textile reinforcement of the expansion hose may be a balanced reinforcing layer of braided, spiraled or wrapped yarns, wherein the yarns are a blend of the first and the second fiber material types. More than one such layer may be used.

In another embodiment, the textile reinforcement of the expansion hose may be a balanced reinforcing layer of braided, spiraled or wrapped yarns, wherein the two types of fiber materials are present as two respective types of yarns, the two types of yarns arranged in an alternating fashion in the balanced layer. The two types of fiber materials may be nylon and polyester.

An embodiment of the expansion hose of the present invention may have a volumetric expansion in the range of from 13% to about 35% at a pressure in the range of from about 1000 psi to about 3000 psi. The expansion hose may thus be adapted for reducing or smoothing pressure fluctuations in a hydraulic system.

The invention is also directed to an assembly including the above described expansion hose and at least one fitting, coupling, bracket, or other hose.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings:

Referring to FIG. 1, an expansion hose is illustrated, constructed according to one embodiment of the present invention. Expansion hose 10 comprises inner tube 11, reinforcement comprising braided layers 12 and 14 separated by friction layer 13, and outer cover 15 positioned over reinforcement layer 14. Tube 11 may comprise one or more layers of one or more flexible materials such as an elastomer or a plastic. In general, the reinforcement may comprise one or more distinct textile layers, which may be balanced braided layers (see FIG. 1) or balanced spiraled layers (see FIG. 3), and which comprise two types of fibers. Balanced means having an equal number of like yarns wrapped, spiraled or braided in each direction around the hose. It also means that yarns of opposite wrap direction have equal but opposite wrap angles, more or less. If the oppositely wrapped yarns are not at the same position radially or in the same layer, a slightly different angle of wrap may be used to compensate for the difference in radial position. The balancing minimizes any tendency for the hose to twist. The embodiment of FIG. 1 shows two braided reinforcing layers 12 and 14, which are braided over inner tube 11. The inner surface material of the tube may be made of one or more suitable flexible elastomeric or plastic materials chosen to withstand the fluids and environmental conditions expected within the hose. Cover 15 may be made of one or more suitable flexible elastomeric or plastic materials designed to withstand the exterior environment encountered. Cover 15 may include a textile covering member for abrasion resistance or other special property. Friction layer 13 may be made of one or more suitable flexible elastomeric or plastic materials designed to bond or adhere the two textile reinforcement layers together. Tube 11, friction layer 13 and cover 15 may be made of the same material or different materials. Tube 10 may be formed by methods including steps such as molding, wrapping, vulcanizing, and/or extrusion.

DETAILED DESCRIPTION

Figure 1:
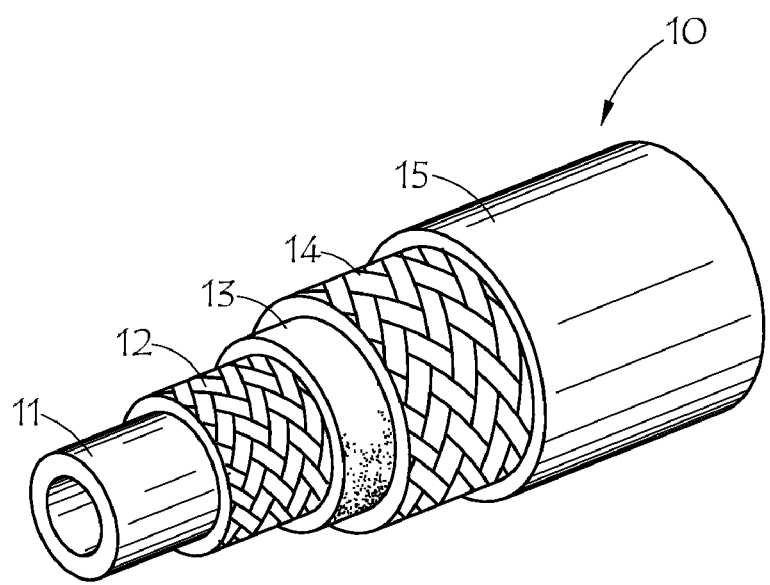
FIG. 1 is a partially fragmented perspective view of an expansion hose constructed in accordance with an embodiment of the present invention.

Referring to FIG. 1, an expansion hose is illustrated, constructed according to one embodiment of the present invention. Expansion hose 10 comprises inner tube 11, reinforcement comprising braided layers 12 and 14 separated by friction layer 13, and outer cover 15 positioned over reinforcement layer 14. Tube 11 may comprise one or more layers of one or more flexible materials such as an elastomer or a plastic. In general, the reinforcement may comprise one or more distinct textile layers, which may be balanced braided layers or balanced spiraled layers, and which comprise two types of fibers. Balanced means having an equal number of like yarns wrapped, spiraled or braided in each direction around the hose. It also means that yarns of opposite wrap direction have equal but opposite wrap angles, more or less. If the oppositely wrapped yarns are not at the same position radially or in the same layer, a slightly different angle of wrap may be used to compensate for the difference in radial position. The balancing minimizes any tendency for the hose to twist. The embodiment of FIG. 1 shows two braided reinforcing layers 12 and 14, which are braided over inner tube 11. The inner surface material of the tube may be made of one or more suitable flexible elastomeric or plastic materials chosen to withstand the fluids and environmental conditions expected within the hose. Cover 15 may be made of one or more suitable flexible elastomeric or plastic materials designed to withstand the exterior environment encountered. Cover 15 may include a textile covering member for abrasion resistance or other special property. Friction layer 13 may be made of one or more suitable flexible elastomeric or plastic materials designed to bond or adhere the two textile reinforcement layers together. Tube 11, friction layer 13 and cover 15 may be made of the same material or different materials. Tube 10 may be formed by methods including steps such as molding, wrapping, vulcanizing, and/or extrusion.

According to the invention, the reinforcement comprises two different types of fibers of synthetic polymer filaments. The two types of synthetic fibers may be selected from polyamides, polyesters, aromatic polyamides or aramids, rayon, acrylics, acetates, polyvinyl alcohol, polyarylene sulfides, polyolefins, and the like. Preferably one fiber type is of higher elongation at break than the other. The difference in elongation between the two fiber types may be 4% or more, in terms of percent elongation. In one embodiment, inner textile layer 12 comprises fibers of a relative high elongation material, such as nylon, acrylic, and the like. A preferred high elongation material for inner textile layer 12 is nylon. A preferred nylon is nylon 66. In the same embodiment, outer textile layer 14 comprises fibers of a relative high modulus, low elongation material, such as aramid, polyester, rayon, polyphenylene sulfide ("PPS"), polyethylene naphthalate ("PEN"), polybenzobisthiazole ("PBT"), ultra-high molecular weight polyethylene ("UHMWPE"), and the like. A preferred low elongation material is polyester. A preferred polyester is polyethylene terephthalate ("PET"). Thus, in one embodiment, inner layer 12 comprises nylon filaments and outer layer 14 comprises polyester filaments. Alternatively, inner textile layer 12 may be of a low elongation fiber and outer textile layer 14 may be of a high elongation fiber.

In accordance with the present invention, it has been found that the combination of a high elongation and a low elongation fiber material as expansion hose reinforcements provides performance properties better than can be achieved with either material alone. The performance improvement may be significantly more than predicted by a linear relationship based on fiber proportions. For example, the combination of nylon and polyester reinforcement is advantageous for expansion hose requiring high burst pressure, high impulse pressure fatigue resistance, and relatively high volumetric expansion, such as required in power steering applications. The invention also provides an improved method of tuning hose expansion for particular applications, reducing resonance in hydraulic systems, reducing noise in hydraulic or non-hydraulic hose systems. These advantages may be realized without need for tuning cables or other complex devices such as described in U.S. Pat. Nos. 5,172,729 and 6,155,378, thus resulting in simpler systems and/or cost reduction.

In an embodiment of the invention, reinforcing layers 12 and 14 may be combined into a single braided layer including some high elongation yarns and some low elongation yarns, for example some nylon yarns and some polyester yarns, braided in a regularly alternating arrangement. For example, every other braider carrier in a multi-carrier braiding machine could apply polyester yarn, the other carriers could apply nylon yarn. If the carrier has multi-end capability, then the braid pattern could be a number of ends of nylon alternating with another number of ends of polyester. Or as another example, every other end of yarn could be polyester yarn alternating with a nylon yarn. The hose may have two or more similar layers of reinforcing yarns, according to the design requirements for the expansion hose application. The reinforcing layers may be separated by a friction layer or adhesive layer.

In yet another embodiment, reinforcing layers 12 and 14 may be combined into a single braided layer of blended yarns comprising a blend of high elongation filaments or fibers and low elongation filaments or fibers, for example a blend of nylon filaments and polyester filaments. Preferably the blend is a yarn spun of a mixture of two staple fibers, or a filament plied yarn of two materials twisted together. Preferably the blended yarn is not a core-sheath construction. Preferably each filament is either of either high elongation material or of low elongation material, e.g. of either nylon or of polyester, and not a molecular blend of the two materials. The hose may have two or more similar layers, according to the design requirements for the hose application.

Nylon refers to any long chain synthetic polyamide having recurring amide groups as an integral part of the polymer chain, including for example nylon 66, which is polyhexamethylenediamine adipamide, and nylon 6, which is polycaprolactam. High-tenacity polyamide fibers or regular tenacity fibers may be used in embodiments of the invention. Representative nylon fibers are marketed by companies such as DuPont, Acordis, and Solutia. Useful nylon yarns or threads may exhibit an elongation at break of from about 13% to about 27%, preferably at least 17%, or from about 19% to about 21%. Useful nylon yarns may range from 500 to 5000 denier and/or may be plied from a number of smaller threads, optionally with a twist of from about 1 to 5 turns per inch.

Polyester refers to any long chain synthetic polymer composed of at least about 85% by weight of an ester of dihydric alcohol and terephthalic acid having recurring amide groups as an integral part of the polymer chain, including for example polyethylene terephthalate or PET. High-tenacity or regular tenacity polyester fibers may be utilized. Representative polyester fibers are marketed by companies such as DuPont, Acordis, and KoSa. Useful polyester yarns or threads may exhibit an elongation at break of from about 10% to about 19%, or from about 11% to about 19%, or about 15%. Useful polyester yarns may range from 500 to 5000 denier and/or may be plied from a number of smaller threads, optionally with a twist of from about 1 to 5 turns per inch.

Thus, in an embodiment of the present invention, a predetermined volumetric expansion and excellent fatigue life can be achieved in an expansion hose by selecting for the reinforcement a yarn having an high elongation, i.e., an elongation greater than about 17%, and a lower elongation yarn having an elongation at least about 4% elongation less than that of the high elongation yarn. In another embodiment, both yarns may have greater than 9% or 10% elongation and a difference in elongation of at least about 4% elongation. Thus, an expansion hose according to the present invention may be formed which exhibits a volumetric expansion somewhere in the range of 13% to 35% at some working pressure in the range of from 6.9 MPa (1000 psi) up to 17.2 MPa (2500 psi) or up to 20.7 MPa (3000 psi).

Yarns may be adhesive treated to improve adhesion to tube, friction layer, or cover, and/or to improve processing or handling. Various treatments known in the art may be useful, including resorcinol formaldehyde latex ("RFL"), epoxy, isocyanate, urethane, and the like. In a preferred embodiment, the yarns are treated in a manner resulting in substantially complete penetration of the yarn by the adhesive treatment. The yarns may be treated for bonding by coating and drying a rubber cement or RFL. Penetration can generally be achieved by running the yarn through a dip tank having an adhesive treatment of sufficiently low viscosity and utilizing over one or more dies or rollers within and/or outside of the dip tank to work the treatment into the yarn. At the same time as the vulcanizing of the hose, the adhesive may be reacted by heat, causing the yarns or filaments to be strongly bonded to one another and/or to one or more rubber or plastic layers of the hose.

Figure 3:
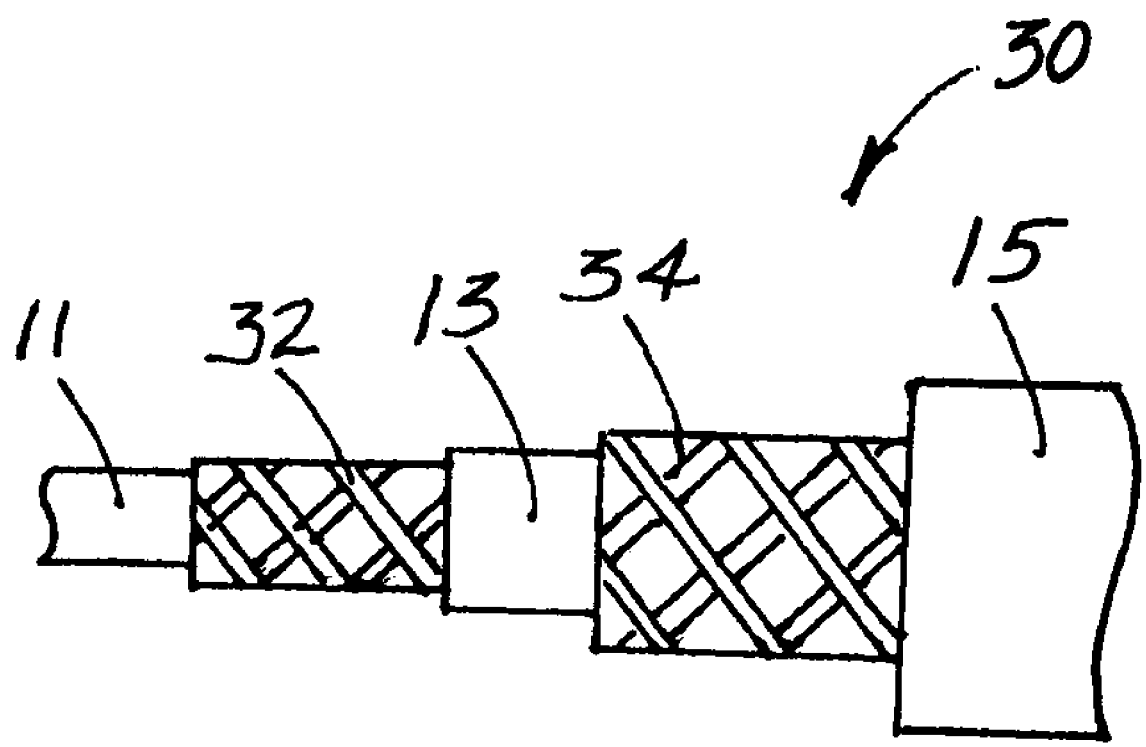
FIG. 3 is a partially fragmented perspective view of an expansion hose constructed in accordance with another embodiment of the present invention.

A textile reinforcement layer may be braided or spiral wrapped. A braided layer includes a certain number of ends wrapped in each direction around the tube and laid in a repeating over/under fashion. One useful arrangement is four ends braided in a two over two under pattern. Another useful braid pattern is three over three under. Nevertheless, any desired braid pattern and/or number of ends may be used. The helix angle may be at or near the so-called "neutral angle" or "lock angle" of about 54°44' with respect to the hose longitudinal axis. If spiral wrapping is used, as illustrated in FIG. 3 by layers 32 and 34 in hose 30, then a layer preferably includes two layers of equal number of yarns and equal pitch, but of opposite wrap direction for balance. A pair of oppositely spiraled layers may include a friction or adhesive layer therebetween. In either case of spiral or braid construction, the helix angle may be in the range from about 40 to 60 degrees, preferably from 47 to 60 degrees, or about 54 degrees.

In a typical braiding process each braider deck can have the required number of yarn carriers or spindles for a complete layer. Of the carriers, half can go clockwise and half counterclockwise. Each carrier may have a cop or spool which may contain single- or multi-end yarns. The number of ends, yarn diameter or bulk, and braid density may be selected to provide a desired level of coverage by the braided layer. Coverage in the range from 50% to about 100% may be advantageous, or from about 60% to about 95%. Generally, as high a density of braid as possible is desirable, while allowing sufficient openness for good rubber penetration for adhesion.

Rubber materials useful for the tube, friction layer(s), and/or cover include chlorosulfonated polyethylene ("CSM"), chlorinated polyethylene elastomer ("CPE"), nitrile, hydrogenated nitrile, fluoroelastomers, ethylene alpha-olefin elastomers (such as EPM, EPDM, and the like) and the like. The rubber materials may be compounded to include various ingredients as is well known in the art, such as fillers, short fibers, plasticizers, antioxidants, antiozonants, stabilizers, process aids, extenders, adhesion promoters, coagents, vulcanizing agents, curatives, and the like. Likewise plastic materials or thermoplastic elastomers may be compounded and/or used instead of rubber or in addition to rubber materials in the tube, friction layers, and/or cover.

In accordance with the present invention, known methods of manufacturing hose may generally be used. The tube may be extruded or plied up on a mandrel. Reinforcement may be applied to the tube as described above. Friction layers may be wrapped, laminated, or extruded onto the reinforcement as needed. Likewise, a cover layer of rubber may be wrapped laminated or extruded as the last layer. Alternately or in addition, a textile cover may be braided, wrapped, or spiraled onto the hose. Textile cover materials are not limited, but preferably may be comprised of spun yarn which may comprise fibers of polyester, nylon, rayon, cotton, aramid, or any other suitable fibers or blends thereof.

Example

An expansion hose for a power steering system was constructed according to an embodiment of the invention and will be referred to herein as the Example hose. The target properties for this expansion hose included a minimum burst pressure of 62 MPa (9000 psi), a volumetric expansion of 22 to 30% at 15.5 MPa (2250 psi).

Three comparative hoses were constructed according to conventional methods and will be referred to herein as Comp. Ex. A, B, and C. Comp. Ex. A and B and the Example hoses were constructed on the same equipment and with the same inner tube of chlorinated polyethylene ("CPE") rubber about 1.5 mm thick (0.060 in) and the same outer cover of CPE rubber. The final outside diameter each hose was about 23.5 mm (0.925 in), and the inside diameter was about 12.7 mm (0.5 in). The Comp. Ex. C utilized chlorosulfonated polyethylene ("CSM") rubber instead of CPE, and the inner tube layer of rubber was somewhat thicker than the other comparative examples. The hoses all included an outer textile cover of spun polyester yarn (8's/3) braided with four ends at or near the neutral angle with twenty-four carriers and a two over two under pattern. The outer textile cover was intended for resistance to environmental conditions but provided no significant mechanical strength. The braided reinforcement layers were all balanced braids produced with four ends on each of twenty-four carriers, two over two under pattern at approximately the neutral angle of about 54 degrees. The reinforcement yarns are discussed in more detail below. In between the two braided reinforcement layers was a friction layer of 0.25 to 0.5 mm thickness (10-20 mils) and of the same rubber composition as the tube and cover.

The hose of Comp. Ex. A was constructed with two braided layers of nylon-66 yarn (840-3 denier yarn, four-end braid). Comp. Ex. B was constructed with two braided layers of polyester yarn (1500/2 denier yarn, four-end braid). The tensile strength and elongation of the yarns are indicated in Table 1. Comp. Ex. C was constructed like Comp. Ex. A, but with a thicker inner tube two mm thick (0.080 in) to decrease the volumetric expansion relative to Comp. Ex. A. The inventive Example was constructed with one braided layer of nylon 6-6 yarn (840-2 denier yarn, 4-end braid), followed by one braided layer of polyester yarn (1500/2 yarn, four-end braid). The yarns were all adhesive treated with RFL which penetrated the yarns substantially to completely.

The hoses were subjected to a volumetric expansion test wherein the percent volume expansion was determined at an internal pressure of 15.5 MPa (2250 psi) and according the procedures of SAE J2050. The hoses were also subjected to a burst pressure test, reported as an average of two tests, according to the procedures of ASTM D380 "Standard Test Methods for Rubber Hose." The hoses were also subjected to an impulse life test according to SAE J343 under an impulse pressure of 15.5 MPa (2250 psi) and at a temperature of 135° C. (275° F.). Average Impulse Life is reported based on an average of three tests. The percent length change of the hoses was also monitored according to the test procedures of SAE J343 and measurement procedures of SAE J517.

TABLE 1

|  | Comp. Ex. A | Comp. Ex. B | Comp. Ex. C | Example |
|---|---|---|---|---|
| Hose Construction | CPE rubber 2 nylon layers (840-3, 4 ends, 24 carriers, 2 over 2 under braid) | 2 polyester layers (1500/2, 4 ends) | Like A, but CSM rubber and thicker tube | 1 nylon layer (840-2, 4 ends) 1 polyester layer (1500/2, 4 ends) |
| Yarn Breaking Tensile (Minimum, lbs) | 42.5 | 51.0 | 42.5 | 28.0 51.0 |
| Yarn elongation at break (%) | 20.3 | 14.5 | 20.3 | 19.0 14.5 |
| % Vol. Exp. | 39.8% | 12.6% | 27.1% | 26.4% |
| Avg. Impulse Life (cycles) | 258,154 | 504,902 | 277,399 | 1,882,789 |
| Burst Pressure | 65.1 MPa (9450 psi) | 64.3 MPa (9320 psi) | Not tested | 68.4 MPa (9925 psi) |
| Length Change | 5.3% | 0.6% | Not tested | 3.4% |

Comp. Ex. A, using only nylon reinforcement, was not able to meet the desired combination of performance targets. Using sufficient nylon yarn to achieve the desired burst pressure rating resulted in too high a volumetric expansion (about 40%). At the impulse test conditions, the hose failed at only 258,134 cycles on the average. Comp. Ex. C illustrates use of another variable, namely inner tube thickness, in order to adjust the volumetric expansion downward with the same nylon reinforcement layers. Nevertheless, Comp. Ex. C still exhibited an impulse test life of only 277,399 cycles.

Comp. Ex. B, using only polyester reinforcement, was not able to meet the desired combination of performance targets. Using sufficient polyester yarn to achieve the desired burst pressure rating resulted in too low a volumetric expansion. The impulse test results were satisfactory, but the low volumetric expansion would not be satisfactory for particular power steering applications, for example those with certain noise limits, damping requirements, and the like.

On the other hand, the Example hose, using one layer of nylon reinforcement and one layer of polyester reinforcement met or exceeded all performance targets. In particular, impulse test life far exceeded expectations, exhibiting an average life of 1,882,789 cycles. Instead of performing somewhere in between Comp. Ex. A and Comp. Ex. B, the Example exhibited both impulse life and burst pressure which were better than the comparative examples, even though the Example had less total reinforcement yarn.

The length change of each of the hoses was within normal limits.

Figure 2:
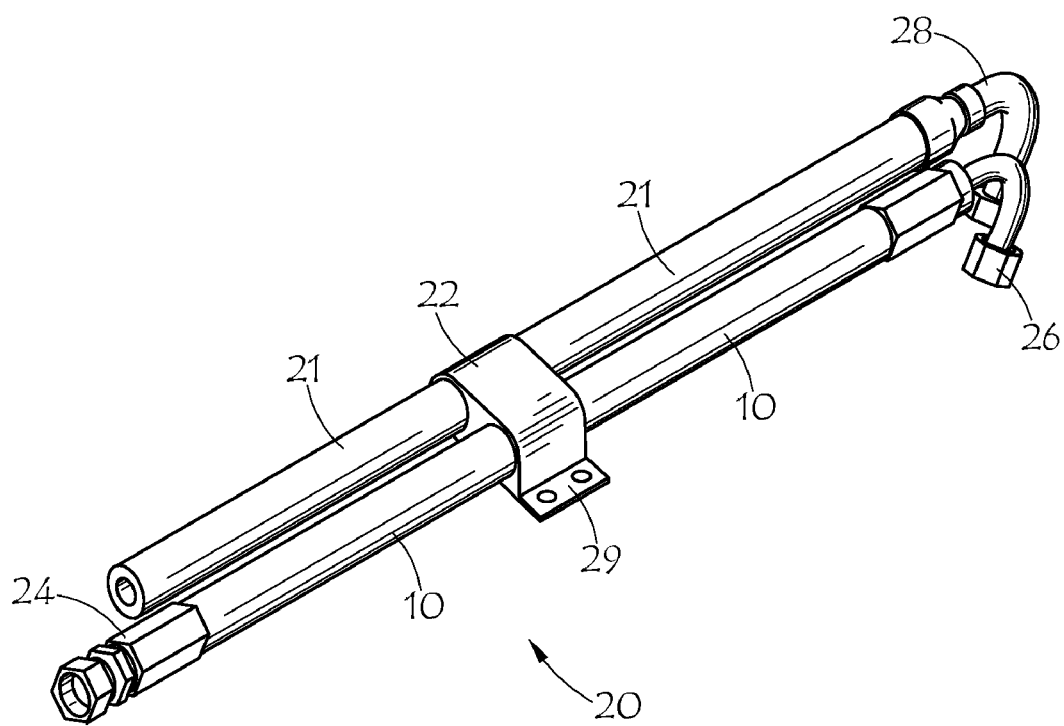
FIG. 2 is a perspective view of a hose assembly according to an embodiment of the present invention.

The invention also relates to an expansion hose assembly having an expansion hose according to an embodiment of the invention and one or more fittings, couplings, mounts, other hoses and the like. An expansion hose assembly according to an embodiment of the invention is illustrated in FIG. 2. Referring to FIG. 2, expansion hose assembly 20 has expansion hose 10 and return hose 21. The two ends of expansion hose 10 have high pressure fittings 24 and 26. Fitting 24 has a crimp connection to the hose and a swivel nut for attaching to other threaded hydraulic fittings which may be part of a hydraulic system. Fitting 26 includes a similar crimp connection, nut, and an elbow. One end of return hose 21 is open for attaching to a nipple or barbed fitting or the like with a band clamp or the like (not shown, but also possibly part of an expansion hose assembly). The other end of return hose 21 has fitting 28 which is also a crimp fitting with threaded swivel nut and elbow. Assembly 20 also has band fitting 22 which holds the two hoses together in a desired parallel relationship. Band fitting 22 also includes mounting bracket 29, which may be integrally molded with the band fitting as shown in this embodiment.

The invention also relates to a method of making an expansion hose with improved properties. In one embodiment, the method includes the steps of: (1) taking a hose design having a high-elongation fiber reinforcement layer or layers; and (2) replacing a portion of the high-elongation fiber with a fiber having a lower elongation at break. The amount of substituted low elongation fiber may be up to 10 or 20% less than the amount of high elongation fiber replaced. The difference in elongation at break between the high and low elongation fibers may be at least about 4% elongation. Preferably, the high elongation fiber has an elongation of at least 17% or more, or from 19% to 27%. The high elongation fiber may be nylon and the low elongation fiber may be polyester. Thus, an expansion hose may be formed having a predetermined or specified volumetric expansion of at least 13% or in the range of 13% to 35% at a pressure in the range of from 1000 psi to 3000 psi.

Although the present invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. An expansion hose comprising an inner tube, a textile reinforcement, and an outer cover; the reinforcement consisting essentially of a plurality of nylon yarns and a plurality of polyester yarns wherein said textile reinforcement comprises a balanced reinforcing layer of braided, spiraled or wrapped yarns, and wherein the nylon and the polyester yarns are arranged in alternating fashion in the balanced layer.

2. The expansion hose of claim 1 wherein the nylon and the polyester yarns have elongations at break differing from each other by at least about 4% elongation.

3. An expansion hose comprising an inner tube, a textile reinforcement, and an outer cover; the textile reinforcement consisting of a first braided layer of nylon yarns and a second braided layer of polyester yarns.

4. The expansion hose of claim 3 wherein said second braided layer is an outer layer relative to said first braided layer.

5. The expansion hose of claim 4 wherein said braided layers have a rubber layer there between, and said textile reinforcement is substantially penetrated with an adhesive treatment.

6. The expansion hose of claim 5 having a volumetric expansion in the range of from about 13% to about 35% at an internal pressure in the range of from 6.9 MPa to 20.7 MPa.

7. The expansion hose of claim 6 having a burst pressure of at least 62 MPa.

8. An expansion hose comprising an inner tube, a textile reinforcement, and an outer cover; the reinforcement consisting of a plurality of nylon yarns in a first balanced pair of spiral wrapped layers, and a plurality of polyester yarns in a second balanced pair of spiral wrapped layers.

9. The expansion hose of claim 8 wherein the first balanced pair is inward of the second balanced pair.

10. The expansion hose of claim 9 further comprising a friction layer between the two balanced pairs of layers.

11. The expansion hose of claim 10 wherein the nylon yarns have an elongation at break of at least about 17% and have higher elongation at break than the polyester yarns by at least about 4% elongation.

12. The expansion hose of claim 10 wherein said textile reinforcement is substantially penetrated with an adhesive treatment.

13. The expansion hose of claim 8 having a burst pressure of at least 62 MPa.

14. The expansion hose of claim 1 wherein the nylon yarns have an elongation at break of at least about 17% and have higher elongation at break than the polyester yarns by from about 4% to about 6% elongation.

15. The expansion hose of claim 3 wherein the nylon yarns have an elongation at break of at least about 17% and have higher elongation at break than the polyester yarns by from about 4% to about 6% elongation.

16. The expansion hose of claim 8 having a volumetric expansion in the range of from about 13% to about 35% at an internal pressure in the range of from 6.9 MPa to 20.7 MPa.

17. A hose assembly comprising an expansion hose for smoothing pressure fluctuations and at least one fitting, coupling, bracket, hose clamp, or other hose; the expansion hose comprising an inner tube, a textile reinforcement, an outer cover; the reinforcement consisting of a first braided or balanced wrapped layer of nylon yarns and a second braided or balanced wrapped layer of polyester yarns.

18. A method comprising:
 a) forming a tube;
 b) applying to said tube (i) a reinforcement consisting essentially of yarns of polyester and yarns of nylon in a balanced braided layer having the two types of yarns arranged in alternating fashion in the balanced braided layer or (ii) a reinforcement consisting of a braided or balanced wrapped first layer of said nylon yarns and a braided or balanced wrapped second layer of said polyester yarns;
 c) applying a friction rubber layer between said first layer and said second layer if the applying alternative (ii) is selected; and
 d) applying a cover layer of rubber and/or textile to form an expansion hose of predetermined burst pressure rating and volumetric expansion, thereby adapted to smooth pressure pulses in a hydraulic system; and
 wherein said yarns are substantially penetrated by an adhesive treatment; and
 whereby said volumetric expansion is greater than 13% at a pressure in the range of from 6.9 MPa to 17.2 MPa, and wherein said nylon layer is an inner layer relative to said polyester layer, and wherein said nylon yarns have greater elongation at break than said polyester yarns.

19. The method of claim 18 wherein said reinforcement consists essentially of a first braided layer of said nylon yarns and a second braided layer of said polyester yarns.

20. A method comprising:
 a) forming a tube
 b) applying to said tube a reinforcement consisting essentially of yarns of polyester and yarns of nylon wherein said reinforcement consists essentially of a first braided layer of said nylon yarns and a second braided layer of said polyester yarns, and wherein said yarns are substantially penetrated by an adhesive treatment;
 c) applying a friction rubber layer between said first braided layer and said second braided layer; and
 d) applying a cover layer of rubber and/or textile to form an expansion hose of predetermined burst pressure rating and volumetric expansion, thereby adapted to smooth pressure pulses in a hydraulic system; and
 whereby said volumetric expansion is greater than 13% at a pressure in the range of from 6.9 MPa to 17.2 MPa, and wherein said nylon layer is an inner layer relative to said polyester layer, and wherein said nylon yarns have greater elongation at break than said polyester yarns.

21. A hose assembly comprising an expansion hose for smoothing pressure fluctuations and at least one fitting, coupling, bracket, hose clamp, or other hose; the expansion hose comprising an inner tube, a textile reinforcement, an outer cover; the reinforcement consisting essentially of yarns of polyester and yarns of nylon in a balanced braided layer having the two types of yarns arranged in alternating fashion in the balanced layer.

* * * * *